(12) United States Patent
Liu

(10) Patent No.: US 9,149,146 B2
(45) Date of Patent: Oct. 6, 2015

(54) FINE FILTER STRUCTURE

(76) Inventor: Ming-Tung Liu, Taipei (TW)

( * ) Notice: Subject to any disclaimer, the term of this patent is extended or adjusted under 35 U.S.C. 154(b) by 567 days.

(21) Appl. No.: 13/585,201

(22) Filed: Aug. 14, 2012

(65) Prior Publication Data
US 2013/0312621 A1 Nov. 28, 2013

(30) Foreign Application Priority Data
May 24, 2012 (TW) .............................. 101118507 A

(51) Int. Cl.
 *A47J 31/00* (2006.01)
 *A47J 31/06* (2006.01)
 *A47J 31/18* (2006.01)

(52) U.S. Cl.
 CPC ............ *A47J 31/0636* (2013.01); *A47J 31/061* (2013.01); *A47J 31/0615* (2013.01); *A47J 31/18* (2013.01)

(58) Field of Classification Search
 CPC ..... A47J 31/06; A47J 31/061; A47J 31/0615; A47J 31/02
 USPC .................................... 99/299, 323, 317, 306
 See application file for complete search history.

(56) References Cited

U.S. PATENT DOCUMENTS

| | | | | |
|---|---|---|---|---|
| 1,188,249 A * | 6/1916 | Cook | ............... | 99/299 |
| 1,866,777 A * | 7/1932 | Sasser | ............... | 99/284 |
| 2,047,134 A * | 7/1936 | Coleman | ............... | 99/298 |
| 2,951,431 A * | 9/1960 | Hugentobler | ............... | 99/299 |
| 8,033,212 B2 * | 10/2011 | Liu | ............... | 99/306 |
| 2012/0160107 A1* | 6/2012 | Tien | ............... | 99/298 |

* cited by examiner

Primary Examiner — Reginald L Alexander
(74) Attorney, Agent, or Firm — Bacon & Thomas, PLLC

(57) ABSTRACT

The present invention is to provide a fine filter structure including two filter units, wherein the first filter unit comprises an upper frame, a coarse screen laid over top side of the upper frame, and a post having a top end formed with at least one through hole, a bottom end fixedly provided on top side of the coarse screen, and a channel in communication with each through hole and bottom side of the coarse screen; and the second filter unit comprises a lower frame and a fine screen laid over top side of the lower frame and having more mesh openings per unit area than the coarse screen. The top side of the lower frame can be connected with the bottom side of the upper frame so as not only to form a single unit but also to form a re-filtration space between the coarse screen and fine screen.

6 Claims, 4 Drawing Sheets

FINE FILTER STRUCTURE

FIELD OF THE INVENTION

The present invention relates to a filter structure, more particularly to a fine filter structure having two extraction filter units with different mesh opening sizes and installed in a brewing container for sequentially filtering the impurities in coffee liquid.

BACKGROUND OF THE INVENTION

According to a research conducted by Dr. Richard Wurtman, a neuroendocrinologist at Massachusetts Institute of Technology, and his colleagues, the invigorating effect of coffee results from an inhibition of brain chemicals that cause drowsiness. Therefore, moderate coffee consumption can help office workers with heavy workloads to keep a clear head, think actively, stay focused, and work efficiently. Many medical journals have also pointed out that coffee has a lot of ingredients that are beneficial to the human health. In particular, caffeine can energize the central nervous system, ward off sleepiness, lower the chances of catching cold, and reduce the occurrence of asthma and edema; the antioxidants in coffee can slow the deterioration of liver diseases, reduce the epidemic rate of chronic liver diseases, and decrease the risks of death caused by complications of liver cirrhosis; the anti-dementia substances in coffee can alleviate the effects of harmful substances on the human body and reduce the content of amyloid in the brain that leads to dementia; and the polyphenol compounds in coffee can retard the oxidation of low-density lipoprotein, dissolve blood blots, and prevent thrombus formation. As more and more advantages of coffee are disclosed, the population of coffee drinkers are on the rise, and with it arises the coffee culture.

Coffee can be prepared in a good number of ways. For example, coffee can be brewed with an ibrik (typically for Turkish coffee), by filtration, by dripping cold water on ground coffee (as for Dutch coffee), and by steeping, wherein each brewing method requires a specific brewing container. In order to secure a share in the coffee-related market, brewing container manufacturers have spared no effort in research and development, hoping to overcome the drawbacks of existing brewing containers and provide consumers with better products. However, as consumers' demands on the performance and physical appearance of brewing containers grow higher and higher, the development of brewing containers becomes increasingly difficult, and the ability to meet such consumer demands is the key to survival in the highly competitive market. Currently, a coffee brewing container is, without exception, equipped with a filtering element for filtering out coffee powder during the brewing process, thereby preventing the coffee powder from being consumed. After brewing, the resulting coffee liquid often contains fatty oil and sediments (e.g., coffee fiber, protein insoluble in water, etc.). When the fatty oil is combined with the sediments, an oily substance known as "coffee colloid" is formed, which substance has a direct impact on the taste of the brewed coffee. More specifically, the coffee will taste thicker or more buttery when there is a relatively large amount of fatty oil and coffee colloid, and smoother or thinner when there is a relatively small amount of fatty oil and coffee colloid. By changing the number of mesh openings of the screen, the amount of fatty oil and coffee colloid can be controlled to adjust the taste of the brewed coffee. However, after years of research in the brewing container-related field, the inventor of the present invention has found that the filtering elements for use in today's brewing containers tend to result in poor user experiences and need further improvement in terms of filtration effect and use.

For instance, FIG. 1 shows a brewing container 1 and a filtering element 2 for use therewith. The brewing container 1 is composed of a cup-shaped body 11, a handle 13, and a lid 15, wherein the handle 13 is mounted on the outer periphery of the cup-shaped body 11 and the lid 15 is pivotally provided on the top side of the cup-shaped body 11. The cup-shaped body 11 has a receiving space therein and a bottom portion provided with a discharge hole and a liquid stopping element (not shown). When the brewing container is placed on a table and the liquid stopping element is not pressed, the discharge hole is covered by the liquid stopping element so as for the user to add hot water and coffee powder into the cup-shaped body 11. When the cup-shaped body 11 is subsequently placed on the top side of a drinking cup, the liquid stopping element is pressed by the drinking cup and covers the discharge hole no more. Consequently, the coffee in the cup-shaped body 11 is free to flow into the drinking cup through the discharge hole. Now that the structures of the discharge hole and of the liquid stopping element are well known in the art and are commercially available, a detailed description of such structures is omitted herein.

Referring again to FIG. 1, the filtering element 2 is received in the cup-shaped body 11 and includes a frame 21, a screen 23, and a hollow post 25. The frame 21 corresponds to the discharge hole and is fixed to the inner bottom surface of the cup-shaped body 11. The screen 23 is laid on the top side of the frame 21. Therefore, the coffee in the cup-shaped body 11 must pass sequentially through the screen 23 and the discharge hole, before flowing out of the cup-shaped body 11. In the process, the coffee powder and coffee colloid in the coffee are blocked by the screen 23 and are thereby kept in the cup-shaped body 11. Since part of the fatty oil is adsorbed to the coffee powder, which is now retained by the screen 23, the out-flowing coffee is low in fatty oil content. The hollow post 25 is provided on the top side of the frame 21 above the screen 23 and is connected to the frame 21 by a plurality of ribs 251. The top side of the hollow post 25 is formed with a plurality of through holes 253, allowing the liquid or air surrounded by the screen 23 and the frame 21 to discharge through the hollow post 25 and the through holes 253. Hence, the screen 23 will not be coated with an excessive amount of coffee powder and sediments which may otherwise prevent the liquid or air surrounded by the screen 23 and the frame 21 from flowing out during filtration.

However, as stated above, the inventor of the present invention has found, after years of research on brewing containers, that the filtering elements used in the existing brewing containers are structurally flawed and tend to cause inconvenience of use. First of all, referring to FIG. 1, when a user wishing to make relatively thin coffee uses a screen 23 with a relatively large number of mesh openings, a large amount of coffee powder and coffee colloid will deposit on the screen 23 and substantially reduce the liquid- and air-permeability thereof. In that case, liquid or air communication between the outer surface and the inner surface of the screen 23 can only be achieved through the flow path provided by the hollow post 25 and the through holes 253, and yet this flow path prevents the liquid (i.e., coffee) in the cup-shaped body 11 from flowing out rapidly. In other words, the user must wait a relatively long time before the coffee can be served. Secondly, when it is desired to clean the filtering element 2, the user is required to put one hand into the cup-shaped body 11 and grip the hollow post 25 in order to pull the filtering element 2 out of the cup-shaped body 11. However, with the fatty oil in the coffee also attached to the hollow post 25, the hollow post 25 will have a slippery surface that is hard to grip, not to mention that the relatively short length (about 0.5 cm) of the hollow post 25 only allows a small portion of the user's fingers to be in contact with the hollow post 25. Therefore, while the user tries to pull out the filtering element 2, the limited area for force application by the fingers tends to hinder the removal of the filtering element 2, making it difficult to clean the filtering element 2.

Given the above, the issue facing the brewing container industry is to overcome the aforesaid drawbacks of the conventional filtering elements and develop a new brewing container which can satisfy consumers' expectations by providing better user experiences.

BRIEF SUMMARY OF THE INVENTION

In view of the various problems in use of the conventional filtering elements, the inventor of the present invention conducted extensive research and experiment and finally succeeded in developing a fine filter structure as disclosed herein. It is hoped that the present invention can solve the foregoing problems effectively.

It is an object of the present invention to provide a fine filter structure having high filtration quality and capable of delivering satisfactory user experiences. The fine filter structure includes a first extraction filter unit and a second extraction filter unit. The first extraction filter unit is composed of an upper frame main body, a coarse screen, and a post. The central portion of the upper frame main body is hollow. The coarse screen is laid on the top side of the upper frame main body. The post, which is at least 2 cm in length, has a top end formed with at least one through hole and a bottom end fixedly provided on the top side of the upper frame main body above the coarse screen. In addition, the post is provided therein with a channel in communication with each through hole and the bottom side of the coarse screen. Thus, air on the bottom side of the coarse screen can flow sequentially through the bottom end, the channel, and the top end of the post and be discharged through the at least one through hole. The second extraction filter unit is composed of a lower frame main body and a fine screen. The central portion of the lower frame main body is also hollow. The fine screen is laid on the top side of the lower frame main body and has more mesh openings per unit area than the coarse screen. The top side of the lower frame main body can be connected with the bottom side of the upper frame main body such that the two frame main bodies not only form a single unit but also form a re-filtration space between the coarse screen and the fine screen. Thus, when coffee powder and hot water are added to a brewing container in which the fine filter structure has been installed in order to make coffee, the coffee powder and the impurities in the coffee liquid will be sequentially filtered by the first extraction filter unit and the second extraction filter unit, in which process the coarse screen blocks the relatively large coffee powder and impurities before the fine screen blocks the relatively small coffee powder and impurities. Thus, each of the screens is kept from being coated with an excessive amount of coffee powder and impurities, and the filtration speed is thereby prevented from being lowered.

Another object of the present invention is to provide the foregoing fine filter structure, wherein the post is at least 2 cm in length so that not only can the user grip the post without having to extend his or her hand deep into the cup-shaped body of the brewing container, but also the large gripping area facilitates force application by the user in order to remove the first extraction filter unit and the second extraction filter unit rapidly.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
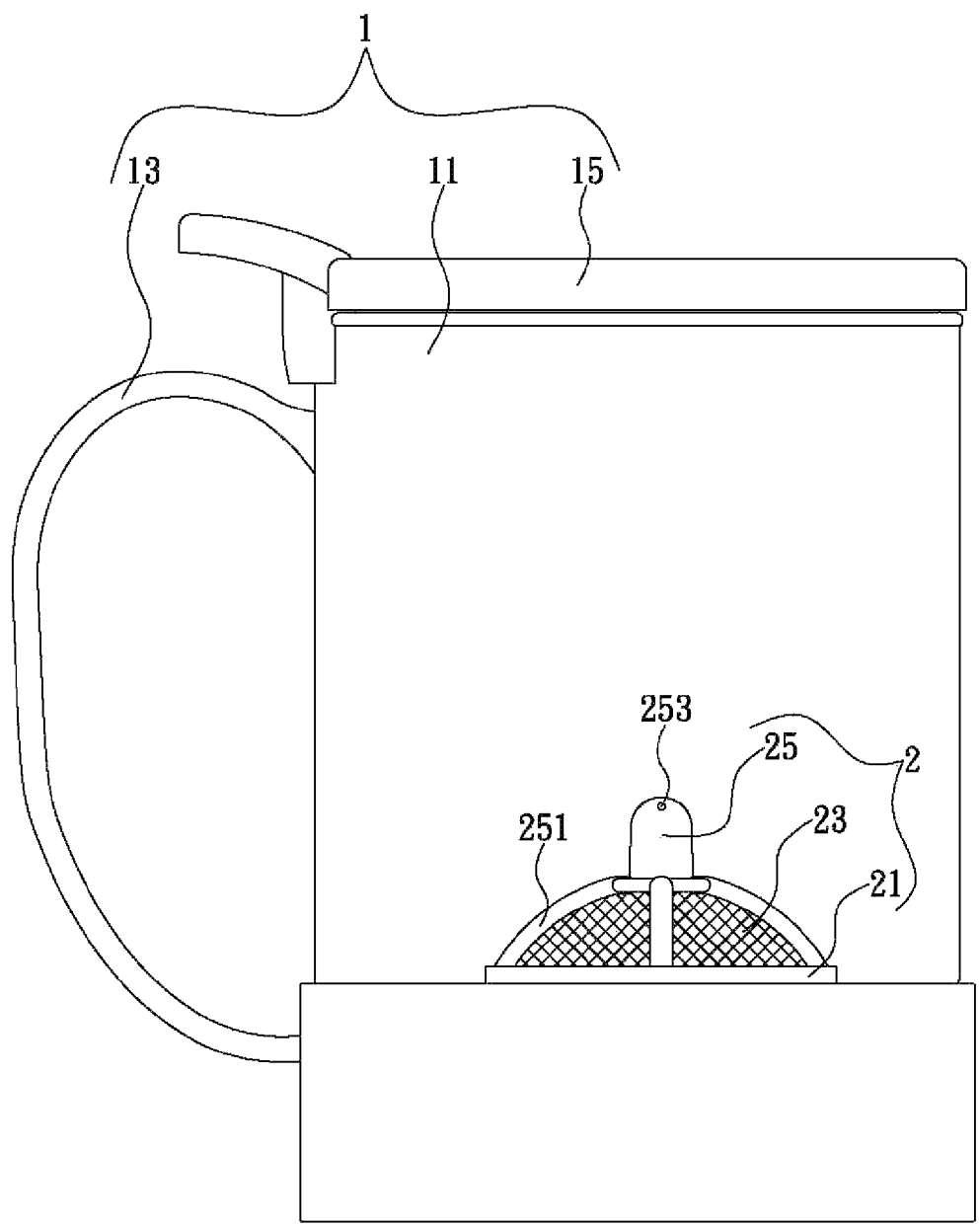
FIG. 1 illustrates a conventional brewing container with a filtering element.
Figure 2:
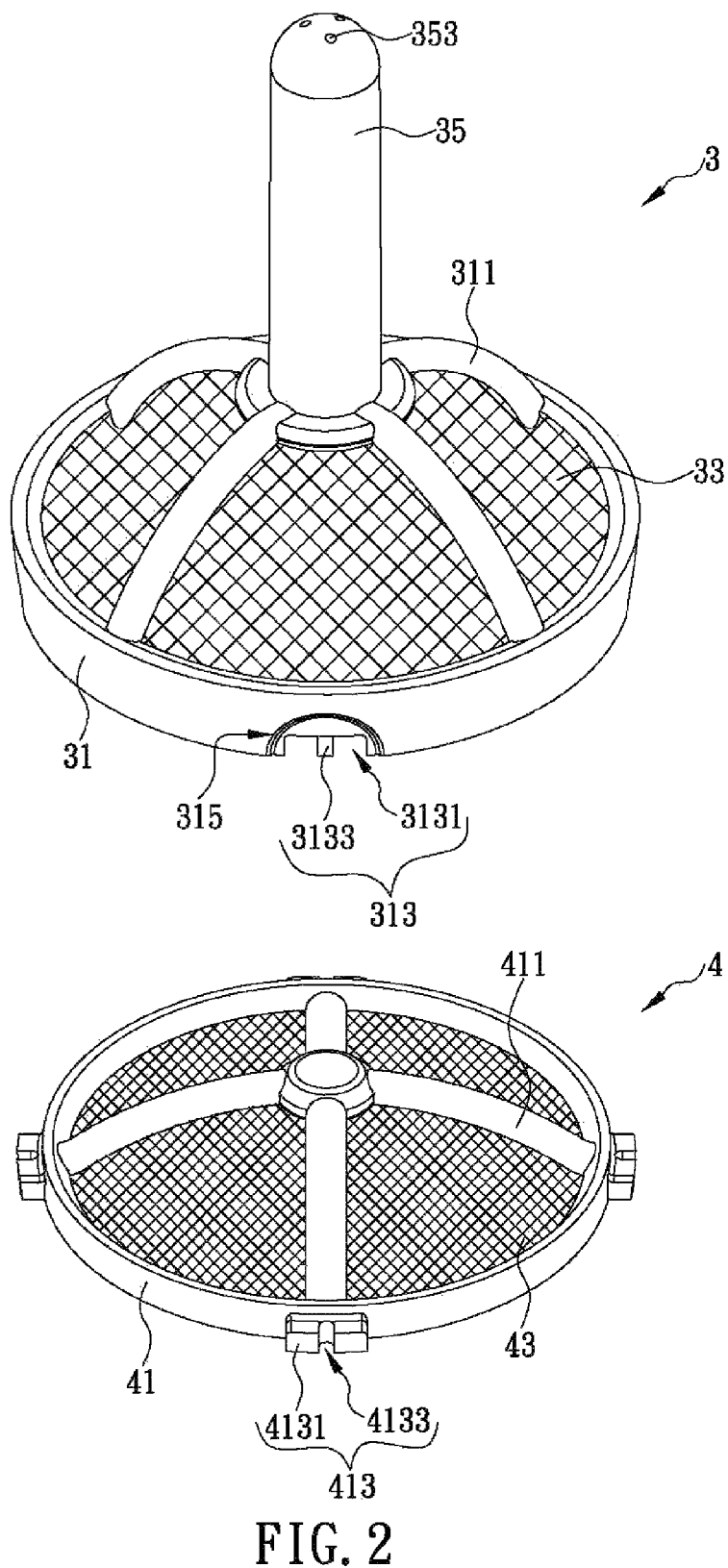
FIG. 2 is an exploded perspective view of a fine filter structure according to the present invention.

The present invention discloses a fine filter structure to be installed in the cup-shaped body of a brewing container. Referring to FIG. 2, the fine filter structure includes a first extraction filter unit 3 and a second extraction filter unit 4. In one embodiment of the present invention, the first extraction filter unit 3 includes an upper frame main body 31, a coarse screen 33, and a post 35. The upper frame main body 31 is circular and has a hollow central portion. The top side of the upper frame main body 31 is provided with a plurality of first ribs 311, wherein each first rib 311 has one end fixed to the upper frame main body 31 and the other end curved and extending toward a central position above the upper frame main body 31. The bottom side of the upper frame main body 31 is provided with a plurality of first connecting portions 313. In this embodiment, the bottom side of the upper frame main body 31 is provided with a plurality of recesses 3131 which are concave toward the top side of the upper frame main body 31. In addition, the bottom surface of each recess 3131 is protrudingly provided with an insertion post 3133 which extends downward from the upper frame main body 31. Each recess 3131 and the insertion post 3133 therein jointly form one first connecting portion 313. Moreover, the outer periphery of the upper frame main body 31 is provided with a plurality of grooves 315 respectively corresponding in position to the first connecting portions 313. The grooves 315 are concave toward the central portion of the upper frame main body 31 such that a level difference is formed between the outer periphery of the upper frame main body 31 and each groove 315.

Figure 3:
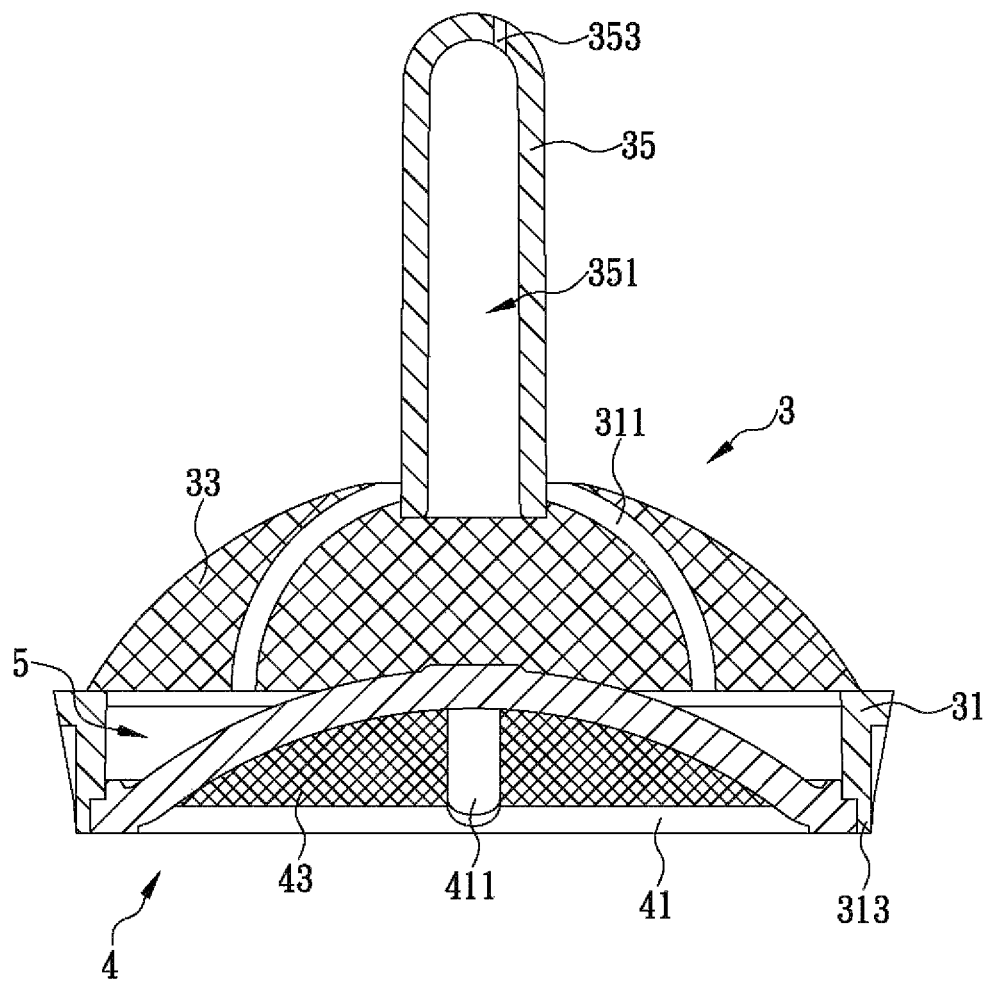
FIG. 3 is an assembled sectional view of the fine filter structure illustrated in FIG. 2.

Referring again to FIG. 2, the coarse screen 33 is laid on the top side of the upper frame main body 31 and is arranged between the first ribs 311. Hence, with the assistance of the first ribs 311, the coarse screen 33 is curvedly and protrudingly provided on the top side of the upper frame main body 31. It should be noted that the coarse screen 33 of the present invention can be made of metal, plastic, or paper, depending on product requirements; therefore, if the material of the coarse screen 33 is capable of providing sufficient support, the first ribs 311 can be dispensed with, in which case the coarse screen 33 is simply laid on the top side of the upper frame main body 31. Reference is now made to FIGS. 2 and 3. The post 35 is at least 2 cm in length. The bottom end of the post 35 is fixedly provided on the top side of the upper frame main body 31 above the coarse screen 33 and is connected to the first ribs 311. The top end of the post 35 is formed with at least one through hole 353. A channel 351 is formed in the post 35 and communicates with each through hole 353 and the bottom side of the coarse screen 33, allowing air or liquid on the bottom side of the coarse screen 33 to pass sequentially through the bottom end, the channel 351, and the top end of the post 35 and be discharged through the through holes 353, thereby forming good circulation.

In the embodiment shown in FIGS. 2 and 3, the coarse screen 33 is an 80-mesh screen, and the length of the post 35 is preferably 2~10 cm, depending on the cup-shaped body in which the first extraction filter unit 3 is to be installed. Thus, when a liquid (e.g., coffee) flows through the coarse screen 33, the relatively large impurities (e.g., coffee powder or coffee colloid) in the liquid will be retained on the outer surface of the coarse screen 33. As the relatively large impurities are often stacked in disorder and form a plurality of gaps therebetween, the relatively small impurities are allowed to flow to the inner surface of the coarse screen 33 without filling up the gaps between the relatively large impurities. Consequently, liquid and air communication between the inner and outer surfaces of the coarse screen 33 is ensured. When it is desired to clean the first extraction filter unit 3, the relatively great length (at least 2 cm) of the post 35 significantly increases the graspable area of the post 35 and thereby facilitates force application by the user. Since the user does not have to extend his or her hand deep into the cup-shaped body of the brewing container, the back of the hand is also prevented from contact with the liquid on the inner wall of the cup-shaped body.

Figure 4:
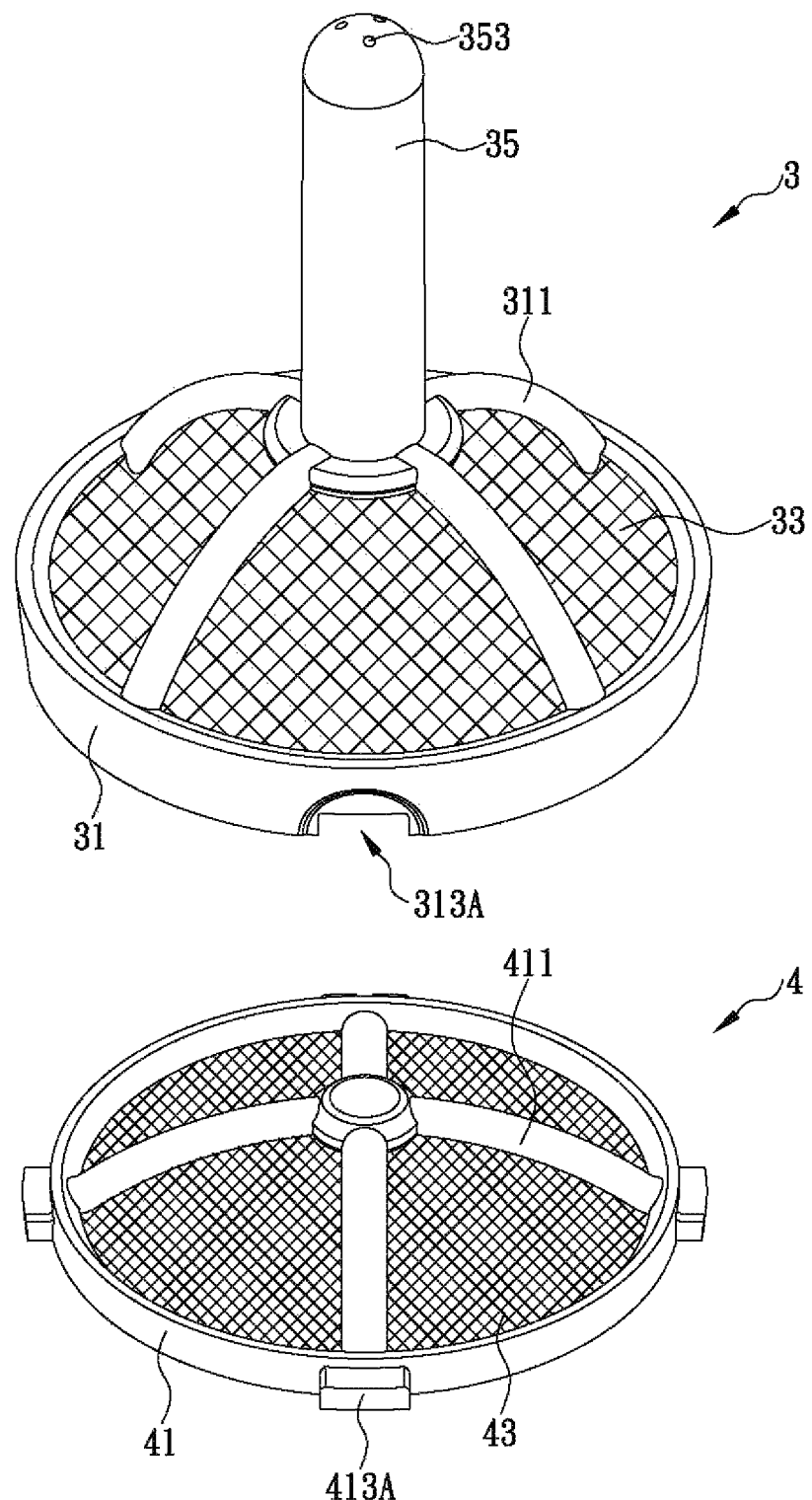
FIG. 4 is an exploded perspective view of another fine filter structure according to the present invention.

As shown in FIGS. 2 and 3, the second extraction filter unit 4 includes a lower frame main body 41 and a fine screen 43. The lower frame main body 41 is circular, has a hollow central portion, and can be connected to the bottom side of the upper frame main body 31. The top side of the lower frame main body 41 is provided with a plurality of second ribs 411, wherein each second rib 411 has one end fixed to the lower frame main body 41 and the other end curved and extending toward a central position above the lower frame main body 41. The lower frame main body 41 is further peripherally provided with a plurality of second connecting portions 413. When the upper frame main body 31 and the lower frame main body 41 are connected together, each first connecting portion 313 is engaged with one of the second connecting portions 413 such that the first extraction filter unit 3 and the second extraction filter unit 4 are connected to form a single unit. In this embodiment, the lower frame main body 41 is peripherally and protrudingly provided with a plurality of blocks 4131. Each block 4131 has an outer edge facing away from the lower frame main body 41 and concavely provided with an insertion hole 4133. Each insertion hole 4133 extends through the top side and the bottom side of the block 4131 where it is formed. Each block 4131 and the insertion hole 4133 therein jointly form one second connecting portion 413. The blocks 4131 can be respectively engaged in the recesses 3131, with the insertion posts 3133 respectively engaged in the insertion holes 4133, so as to connect the corresponding first and second connecting portions 313 and 413 tightly together. Once the first extraction filter unit 3 and the second extraction filter unit 4 are thus connected, a level difference exists between the outer edge of each block 4131 and the corresponding groove 315. By putting a fingertip into one of the level difference area and exerting a force on the block 4131 therein, a user can easily separate the first extraction filter unit 3 and the second extraction filter unit 4 from each other. In a different embodiment of the present invention, however, both the first connecting portions 313 and the second connecting portions 413 are dispensed with, and in that case, the lower frame main body 41 and the upper frame main body 31 can be so configured that the former is engageable in the latter. Alternatively, the first connecting portions 313 and the second connecting portions 413 may be modified in configuration. For example, referring to FIG. 4, the bottom side of the upper frame main body 31 is provided with a plurality of first connecting portions 313A which are concave toward the top side of the upper frame main body 31 and have a recessed configuration. The lower frame main body 41, on the other hand, is peripherally and protrudingly provided with a plurality of second connecting portions 413A which are block-shaped. Thus, by engagement between the first connecting portions 313A and the second connecting portions 413A, the upper frame main body 31 and the lower frame main body 41 can be connected to form a single unit.

Referring again to FIGS. 2 and 3, the fine screen 43 is laid on the top side of the lower frame main body 41 and is arranged between the second ribs 411. As is the case with the first ribs 311, the second ribs 411 can be omitted if the material of the fine screen 43 allows, and in that case, the fine screen 43 will be laid on the top side of the lower frame main body 41 without the second ribs 411. The fine screen 43 has more mesh openings per unit area than the coarse screen 33. In this embodiment, the fine screen 43 is a 120~200-mesh screen. Once the top side of the lower frame main body 41 is connected with the lower side of the upper frame main body 31, a re-filtration space 5 is formed between the fine screen 43 and the coarse screen 33; in other words, the fine screen 43 will not lie in its entirety against the coarse screen 33. This allows the liquid having flown into the re-filtration space 5 to be filtered by the fine screen 43, and those relatively small impurities that are not small enough to pass through the fine screen 43 will eventually be retained in the re-filtration space 5. When the fine filter structure described above is installed in a brewing container, and coffee powder and hot water are subsequently added into the brewing container to make coffee, the resulting coffee liquid will sequentially undergo a first filtration process by the first extraction filter unit 3 and a second filtration process by the second extraction filter unit 4. In the first filtration process, relatively large impurities are retained on the outer surface of the coarse screen 33 while relatively small impurities are allowed to flow into the re-filtration space 5 through the gaps between the relatively large impurities. In the second filtration process that follows, the coffee liquid in the re-filtration space 5 is filtered for a second time by the second extraction filter unit 4 such that the relatively small impurities that are not small enough to pass through the fine screen 43 are retained on the outer surface of the fine screen 43. As the impurities deposited on the outer surface of the fine screen 43 are relatively small and hence unlikely to cover the entire fine screen 43, and the impurities deposited on the outer surface of the coarse screen 33 are relatively large and hence form relatively large gaps therebetween, the coffee liquid can flow rapidly through the first extraction filter unit 3 and the second extraction filter unit 4, without any one of the screens being coated with an excessive amount of impurities. Thus, the fine filter structure of the present invention features both good filtration effect and high filtration speed.

While the invention herein disclosed has been described by means of specific embodiments, numerous modifications and variations could be made thereto by those skilled in the art without departing from the scope of the invention set forth in the claims.

What is claimed is:

1. A fine filter structure, to be installed in a cup-shaped body of a brewing container, the fine filter structure comprising:
 a first extraction filter unit comprising:
 an upper frame main body having a hollow central portion; wherein the bottom side of the upper frame main body is provided with a plurality of first connecting portions, each said first connecting portion comprises a recess and an insertion post provided on a bottom surface of the recess, each said recess is provided on a bottom side of the upper frame main body and is concave toward a to side of the upper frame main body, and each said insertion post extends downward from the upper frame main body;
 a coarse screen laid on the top side of the upper frame main body; and
 a post which has a bottom end fixedly provided on the top side of the upper frame main body above the coarse screen, is of a length of at least 2 cm, is provided therein with a channel, and has a top end formed with at least a through hole, wherein the channel is in communication with each said through hole and a bottom side of the coarse screen; and
 a second extraction filter unit comprising:
 a lower frame main body having a hollow central portion; wherein the lower frame main body is peripherally provided with a plurality of second connecting portions, each said second connecting portion is connectable with one said first connecting portion and comprises a block and an insertion hole, each said block has an outer edge which faces away from the lower frame main body and is concavely provided with a said insertion hole, each said insertion hole extends through a top side and a bottom side of a corresponding said block and, when the lower frame main body and the upper frame main body are connected with each other, the blocks are respectively engaged in the recesses, and the insertion posts are respectively engaged in the insertion holes; and
 a fine screen laid on a top side of the lower frame main body and having more mesh openings per unit area than the coarse screen, wherein the top side of the lower frame main body is connectable with the bottom side of the upper frame main body such that a re-filtration space is formed between the fine screen and the coarse screen.

2. The fine filter structure of claim 1, wherein the upper frame main body has an outer periphery provided with a plurality of grooves which respectively correspond in position to the first connecting portions and which are concave toward the central portion of the upper frame main body such that a level difference is formed between the outer periphery of the upper frame main body and each said groove.

3. The fine filter structure of claim 2, wherein the top side of the upper frame main body is provided with a plurality of first ribs, each said first rib has an end fixed to the upper frame main body and an opposite end curved and extending toward a central position above the upper frame main body and connected to the bottom end of the post.

4. The fine filter structure of claim 3, wherein the top side of the lower frame main body is provided with a plurality of second ribs, each said second rib has an end fixed to the lower frame main body and an opposite end curved and extending toward a central position above the lower frame main body.

5. The fine filter structure of claim 4, wherein the coarse screen is an 80-mesh screen, and the fine screen is a 120~200-mesh screen.

6. The fine filter structure of claim 5, wherein the length of the post is 2~10 cm.

\* \* \* \* \*